Sept. 18, 1934.　　W. H. NICHOLS　　1,974,364
HOUSING FOR ELECTRICAL CONNECTIONS
Filed Feb. 9, 1933
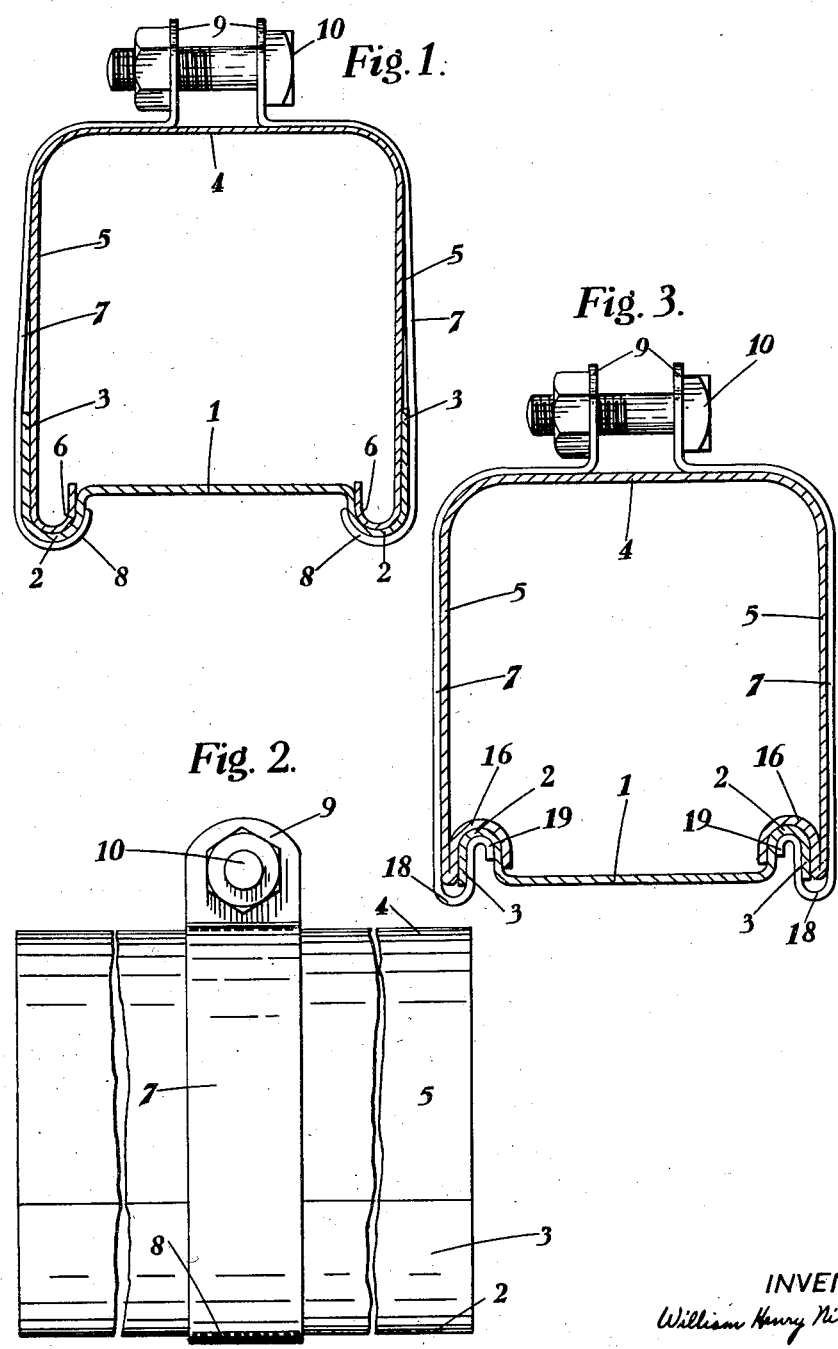
INVENTOR
William Henry Nichols
BY
his ATTORNEYS Patented Sept. 18, 1934

1,974,364

UNITED STATES PATENT OFFICE 1,974,364

HOUSING FOR ELECTRICAL CONNECTIONS

William Henry Nichols, Buckinghamshire, England, assignor to W. T. Henley's Telegraph Works Company Limited, London, England, a British company Application February 9, 1933, Serial No. 655,911
In Great Britain February 18, 1932

4 Claims. (Cl. 247—7)

This invention relates to housings of relatively long and narrow box form suitable for enclosing electrical connections. Such a type of housing is adapted to serve as a terminal box, for instance for pole mounting, or as a unit in a distributing pillar and for other purposes. The construction is particularly suitable for cases of end entrance and side exit. For instance, it can be used where a multicore cable comes in at one end and the separate cores go to terminals or cutouts or other fittings mounted in a line of insulators carried by one side of the housing.

The box consists of a relatively long body and end portions. In accordance with the invention the body is formed of two parts of sheet metal construction, one serving as a back plate and the other in the form of a trough, the two parts being adapted to fit together and make tight longitudinal joints.

The invention will be further described with reference to the accompanying drawing which illustrates two examples of a sheet metal terminal box constructed in accordance with the invention. In the drawing, Figure 1 is a cross sectional view of one form of terminal box, Figure 2 is a fragmental side elevation of the box shown in Figure 1 and Figure 3 is a cross sectional view of a second form of terminal box.

In both of the illustrated examples of construction, the back plate consists of a central portion 1 and two side portions formed from a single strip of metal but it may, however, be fabricated from two or more parts. The central portion 1 will generally be flat and adapted to carry insulators for the support of terminals or other fittings. The two side portions form channels 2 where they join on to the central portion 1 and have their outer edges extended to form flanges 3 standing approximately at right angles to the central portion. The channels 2 may be formed with their inner surfaces facing the interior of the box as in Figure 1 or facing the exterior as in Figure 3. In the examples illustrated these channels 2 are of approximately semi-circular shape but they may be made of any other appropriate shape such that together the two side portions and the centre portion form a plate and two flanges with pronounced channels in the corners between them.

The trough forms the other three sides of the body of the box. In both examples, the trough is of rectangular form with well rounded corners at the base 4 of the trough and with the edges of the sides 5 of the trough bent over to fit the channels 2 in the back plate. In the case where the channels are formed with their inner surfaces facing the interior of the box, the edges of the sides 5 are bent over and of such dimensions that they are a good fit in the channels. As an alternative to rolling over the edges as shown in Figure 1 they may be provided with beadings or wires of the same shape as the channels. In the case where the channels are formed in the converse direction, for example as shown in Figure 3, the edges of the sides 5 are bent over and shaped to form channels 16, lying around the inside or outside edges of the sides, which receive the channels in the back plate, the latter being a good fit in the former. It is preferred in both cases to bend over the edges or to form the beadings, as the case may be, in an inward direction to give the box a neater appearance. In all cases the distance between the longitudinal rolled or beaded edges of the trough is normally slightly different from the corresponding distance between the channels in the back plate. This necessitates slightly deforming the trough in order to fit together the rolled or beaded edges on the trough and the channels on the back plate and this elastic deformation ensures the maintenance of considerable pressure between the jointing surfaces. Thus, when the edges of the trough are rolled or beaded inwardly and the channels in the back plate formed as in Figure 1, the sides of the trough are normally slightly further apart externally than the distance between the flanges 3 of the back plate so that when the sides of the trough are forced in between these flanges, the trough is closed slightly. Owing to the resilience of the trough a very considerable pressure is then exerted between the sides of the trough and the flanges of the back plate. At the same time the rolled edges 6 of the trough are pressed forcibly against the inner surfaces of the channels of the back plate. As a result there is produced between the two parts of the body of the box a very effective joint capable of preventing leakage of insulating compound when this is used inside the box. The fit between the edge of the trough and the channel in the back plate may in some cases be assisted by the use of a thin layer of packing material between them.

The back plate will in practice usually be the fixed part of the body of the box and the trough the removable part. This gives the maximum accessibility to the interior of the box. To place the trough in position the sides of one end of the trough are deformed, preferably by pressing them inwards slightly, to enable this end to be fitted to the back plate, the trough being held at an inclination to the back plate at this stage. As the edges of the trough are forced into engagement with the back plate channels the angle of inclination is gradually reduced until these edges are in complete engagement with the channels.

It is preferred to use hooked straps of metal to secure together the two parts of the body. These are used in pairs, the number of pairs being of course dependent upon the length of the box. Each strap has at one end a hook shaped to engage the channel 2 connecting the flange to the central part of the back plate. In the form of construction shown in Figures 1 and 2, the hook 8 is shaped to fit round the outside of the channel 2, in the second form of construction illustrated in Figure 3, the hook 18 is of pot-hook form, the small end 19 of which fits in the channel 2 and the larger end round the flange 3 and the bent over edge of the wall of the box. From the hook-end the strap extends back along the sides of the flange and the wall 5 of the trough and bends round the base 4 of the trough. At this part it is preferably provided with an off-set end 9 having a hole through which a bolt 10 passes to connect with the other strap of the pair, which is located at the opposite side of the trough. In placing this strap in position the hooked end is brought into engagement with the outside of the channel part 2 while the flat part of the strip is inclined outwardly from the side of the trough. It is then turned until it lies in contact with the side of the flange and trough, the rear end being sprung into position slightly in order to fit against the base of the trough. It will be apparent that the positioning of these straps is very much facilitated if the channels 2 in the back plate are made of substantially semi-circular shape so that the straps may pivot about this channel and if the corners between the base and sides of the trough are well rounded off.

The form of the parts used to make the ends of the box is dependent upon the purpose for which the box is to be employed. In the majority of cases one end part will be of a form which provides a place of entry for a cable, for instance, a sealing box, and the other end portion will usually be a simple form of closure. It may however provide for the entry or the exit of a connection. If the box is to be filled with sealing compound, one end fitting will generally provide a filling aperture and it may also serve as an expansion dome. The back plate will usually be connected with one of the end parts and will remain in position during the making of the connections. The other end part may be carried by the back plate or by the back plate and trough jointly.

What I claim as my invention and desire to secure by Letters Patent is:—

1. In a housing suitable for enclosing electrical connections a relatively long body portion comprising a back plate consisting of a central portion and of two side portions which stand at an angle to the central portion and form longitudinal channels adjoining the said central portion, and an elastically deformed trough having its longitudinal edges shaped to fit the channels in the back plate, and, for retaining the trough in position on the back plate, means comprising at least one pair of hooked straps of metal, of which the hook of each strap engages one of the channels in the back plate and the remaining part of the strap extends back along the adjacent side wall of the trough and round the base thereof and has means for connecting it with the other strap of the pair lying on the opposite side of the housing.

2. In a housing suitable for enclosing electrical connections a relatively long body portion comprising a back plate of sheet metal construction consisting of a central portion and of two side portions which stand at an angle to the central portion and form longitudinal channels adjoining the said central portion, and a trough of sheet metal construction of which the longitudinal edges are bent over each to fit one of the channels in the back plate, the distance between the said bent over edges differing from the corresponding distance between the channels by an amount which necessitates elastically deforming the trough, when the trough and back plate are fitted together, to an extent sufficient to ensure the maintenance of considerable pressure between the interengaging surfaces.

3. In a housing suitable for enclosing electrical connections a relatively long body portion comprising a sheet metal back plate consisting of a central portion, upstanding side portions and longitudinal channel portions, of which the inner surfaces are disposed towards the interior of the housing, uniting the said upstanding portions to the central portion, and a sheet metal trough having its longitudinal edges rolled over each to fit in one of the said channels, the location of the two rolled edges being such that, before the rolled over edges of the trough may be fitted in the corresponding channels in the back plate, an elastic deformation of the trough sufficient to ensure that considerable pressure is exerted between the interengaging parts is necessary.

4. In a housing suitable for enclosing electrical connections a relatively long body portion comprising a sheet metal trough having each of its longitudinal edges bent into the form of a channel of which the outside surface thereof is disposed towards the base of the trough, and a sheet metal back plate consisting of a central portion and of two side portions which stand at an angle to the central portion and form longitudinal channels adjoining the said central portion, the channels in the back plate being adapted to be fitted in those on the trough when the latter is in a state of slight elastic deformation, the said elastic deformation being sufficient to ensure that considerable pressure is exerted between the said channels.

WILLIAM H. NICHOLS.